United States Patent
Amulothu et al.

(10) Patent No.: US 11,362,947 B2
(45) Date of Patent: Jun. 14, 2022

(54) INTERCONNECTING MULTIPLE SEPARATE OPENFLOW DOMAINS

(71) Applicant: KYNDRYL, INC., New York, NY (US)

(72) Inventors: Venkata Siva N. Amulothu, Plano, TX (US); Ashish Kapur, Santa Clara, CA (US); Vishal Shukla, San Jose, CA (US)

(73) Assignee: KYNDRYL, INC., New York, NY (US)

( * ) Notice: Subject to any disclaimer, the term of this patent is extended or adjusted under 35 U.S.C. 154(b) by 16 days.

(21) Appl. No.: 16/580,356

(22) Filed: Sep. 24, 2019

(65) Prior Publication Data

US 2020/0021524 A1  Jan. 16, 2020

Related U.S. Application Data

(62) Division of application No. 14/993,177, filed on Jan. 12, 2016, now Pat. No. 10,484,282.

(51) Int. Cl.
*H04L 12/46* (2006.01)
*H04L 45/7453* (2022.01)

(52) U.S. Cl.
CPC ...... *H04L 45/7453* (2013.01); *H04L 12/4641* (2013.01)

(58) Field of Classification Search
CPC ... H04L 45/74; H04L 45/745; H04L 45/7453; H04L 12/46; H04L 12/4641;

(Continued)

(56) References Cited

U.S. PATENT DOCUMENTS 6,850,980 B1   2/2005  Gourlay
7,020,160 B1 *  3/2006  Achler ............... H03M 7/30
                                                    370/466

(Continued)

OTHER PUBLICATIONS

Lospoto et al., "Rethinking virtual private networks in the software-defined era," IFIP/IEEE International Symposium on Integrated Network Management (IM), Ottawa, ON, 2015, pp. 379-387 (Year: 2015).*

(Continued)

*Primary Examiner* — Un C Cho
*Assistant Examiner* — Lalita W Pace
(74) *Attorney, Agent, or Firm* — Erik Swanson; Andrew M. Calderon; Roberts Calderon Safran & Cole, P.C.

(57) ABSTRACT

A computer-implemented method comprising: receiving, by a first controller device in a first OpenFlow domain, a packet from an originating endpoint in the first OpenFlow domain destined for a destination endpoint in a second OpenFlow domain that is separate from the first OpenFlow domain; outputting, by the first controller device, a broadcast message identifying the destination endpoint to a plurality of respective controller devices associated with separate OpenFlow domains; receiving, by the first controller device, a response to the broadcast message from the destination endpoint via a second controller device associated with the second OpenFlow domain; updating, by the first controller device, a local flow table identifying a flow for transmitting the packet to the destination endpoint based on information included in the response; and transmitting, by the first controller device, the packet towards the destination endpoint based on updating the local flow table.

20 Claims, 10 Drawing Sheets

(58) Field of Classification Search
CPC ......... H04L 29/12018; H04L 29/12028; H04L 61/10; H04L 61/103
See application file for complete search history.

(56) References Cited

U.S. PATENT DOCUMENTS

| | | | |
|---|---|---|---|
| 9,621,453 B1* | 4/2017 | Pani | H04L 47/22 |
| 2012/0300615 A1 | 11/2012 | Kempf et al. | |
| 2013/0170502 A1 | 7/2013 | Chen et al. | |
| 2014/0211661 A1 | 7/2014 | Gorkemli et al. | |
| 2014/0269683 A1 | 9/2014 | Bhagavathiperumal et al. | |
| 2015/0003259 A1 | 1/2015 | Gao | |
| 2015/0043576 A1 | 2/2015 | Dixon et al. | |
| 2015/0163151 A1* | 6/2015 | Li | H04L 41/044 |
| | | | 370/236 |
| 2015/0222543 A1* | 8/2015 | Song | H04L 45/66 |
| | | | 370/392 |
| 2015/0172156 A1 | 9/2015 | Lohiya et al. | |
| 2015/0281073 A1 | 10/2015 | Kotha et al. | |
| 2015/0281075 A1 | 10/2015 | Park et al. | |
| 2015/0326524 A1 | 11/2015 | Tankala et al. | |
| 2016/0020993 A1* | 1/2016 | Wu | H04L 43/028 |
| | | | 370/392 |
| 2016/0050654 A1 | 2/2016 | Kanaumi | |
| 2016/0134527 A1* | 5/2016 | Kwak | H04L 45/586 |
| | | | 370/352 |
| 2016/0156552 A1 | 6/2016 | Li | |
| 2016/0254984 A1* | 9/2016 | Tekalp | H04L 45/02 |
| | | | 709/242 |
| 2016/0308766 A1* | 10/2016 | Register | H04L 43/028 |
| 2016/0359736 A1* | 12/2016 | Qi | H04L 43/026 |
| 2017/0041227 A1 | 2/2017 | Zhou | |
| 2017/0078184 A1* | 3/2017 | Tang | H04L 45/38 |
| 2017/0104672 A1* | 4/2017 | Liang | H04L 45/52 |
| 2017/0195255 A1* | 7/2017 | Pham | H04L 41/20 |
| 2017/0201455 A1 | 7/2017 | Amulothu et al. | |

OTHER PUBLICATIONS

Phemius et al., "DISCO: Distributed Multi-domain SDN Controllers", IEEE, Aug. 29, 2013; 8 Pages.

Phan et al., "A Collaborative Model for Routing in Multi-Domains OpenFlow Networks", 2013 International Conference on Computing, Management, and Telecommunications, IEEE, 2013, pp. 278-283.

Das et al., "Unifying Packet and Circuit Switched Networks with OpenFlow", Standford University, Dec. 7, 2009; 10 Pages.

Open Networking Foundation, "OpenFlow Switch Specification", Wire Protocol 0x05, Version 1.4.0, Oct. 14, 2013; 205 Pages.

Juniper Networks, Example: OpenFlow Traffic Steering Across MPLS Networks Using MPLS LSP Tunnel Cross-Connects, http://www.juniper.net/techpubs/en_US/junos13.3/topics/example/junos-sdn-openflow-into-mpls-using-ccc-and-logical-tunnels-configuring.html, Jan. 9, 2014; 18 Pages.

Mell et al., "The NIST Definition of Cloud Computing", NIST, Special Publication 800-145, Sep. 2011, 7 pages.

List of IBM Patents or Patent Applications Treated as Related, dated Sep. 20, 2019, 1 page.

* cited by examiner

INTERCONNECTING MULTIPLE SEPARATE OPENFLOW DOMAINS

BACKGROUND

The present invention generally relates to OpenFlow networks, and more particularly, to connecting endpoints between different OpenFlow domains.

OpenFlow is an open standard that enables researchers to run experimental protocols in networks. OpenFlow is a feature often found in commercial Ethernet switches, routers and wireless access points, OpenFlow provides a standardized mechanism to allow researchers to run experiments, without requiring vendors to expose the internal workings of their network devices.

In a classical router or switch, the fast packet forwarding (data path) and the high level routing decisions (control path) occur on the same device. An OpenFlow Switch separates these two functions. The data path portion still resides on the switch, while high-level routing decisions are moved to a separate controller, typically a standard server. The OpenFlow Switch and Controller communicate via the OpenFlow protocol, which defines messages, such as packet-received, send-packet-out, modify-forwarding-table, and get-stats.

The data path of an OpenFlow Switch presents a clean flow table abstraction; each flow table entry contains a set of packet fields to match, and an action (such as send-out-port, modify-field, or drop). When an OpenFlow Switch receives a packet it has never seen before, for which it has no matching flow entries, it sends this packet to the controller. The controller then makes a decision on how to handle this packet. It can drop the packet, or it can add a flow entry directing the switch on how to forward similar packets in the future. For example, if the controller knows how to reach a destination device, the controller will send the packet to the switch connected to the destination device (which may be a different switch than the switch connected to an originating device from where the packet originated). Otherwise, the controller outputs a broadcast message to all of the switches in the domain. The broadcast message includes an address or other identifier of the destination device, and the destination device matching the identifier responds to the broadcast message via its connected switch. The response includes the switch ID, the port ID, and other information used to route the packet to the destination device, and the controller then transmits the packet to the destination device. The controller may update a flow table so that the next time a packet is sent to this particular destination device, the controller can send the packet to the destination device (via the device's switch) without the need to send out a broadcast message.

Currently, an OpenFlow controller can be used to design, deploy, and control a single network which is directly managed by that controller. There are increasing numbers of OpenFlow deployments which are located at different geographical locations. There is no known technique for establishing communication between hosts/networking elements part of one OpenFlow domain to communicate with hosts/networking elements of other OpenFlow domains.

SUMMARY

In an aspect of the invention, a computer-implemented method includes: receiving, by a first controller device in a first OpenFlow domain, a packet from an originating endpoint in the first OpenFlow domain destined for a destination endpoint in a second OpenFlow domain that is separate from the first OpenFlow domain; outputting, by the first controller device, a broadcast message identifying the destination endpoint to a plurality of respective controller devices associated with separate OpenFlow domains; receiving, by the first controller device, a response to the broadcast message from the destination endpoint via a second controller device associated with the second OpenFlow domain; updating, by the first controller device, a local flow table identifying a flow for transmitting the packet to the destination endpoint based on information included in the response; and transmitting, by the first controller device, the packet towards the destination endpoint based on updating the local flow table. In a further aspect, the method includes installing a flow in an edge device of the first OpenFlow network based on the information included in the response, wherein transmitting the packet includes transmitting the packet via edge device. In a further aspect, the outputting the broadcast message includes transmitting the broadcast message via a first edge device of the first OpenFlow network to a plurality of respective edge devices associated with separate OpenFlow domains, and the receiving the response includes receiving the response via the first edge device from the second controller device via a second edge device of the second OpenFlow domain. In a further aspect, the first edge device encrypts the broadcast message prior to transmitting the broadcast message, and decrypts the response prior to the first controller receiving the response.

In an aspect of the invention, there is a computer program product comprising a computer readable storage medium having program instructions embodied therewith, The program instructions are executable by a first controller device to cause the first controller device to: build a first local flow table that stores flow information regarding endpoints in a same OpenFlow domain as the first controller device; output the first local flow table to a second controller device residing in a different OpenFlow domain as the first controller device; receive a second local flow table from the second controller device, wherein the second local flow table stores flow information regarding endpoints in a same OpenFlow domain as the second controller device; and update the first local flow table based on receiving the second local flow table. In a further aspect, the program instructions further cause the first controller device to periodically communicate with the second controller device to synchronize the first local flow table of the first controller device with the second local flow tables of the second controller device. In a further aspect, when periodically communicating with second controller device comprises receiving a hash value of the second local flow table from the second controller device; and requesting an updated second local flow table from the second controller device when the hash value does not match a hash value of the first local flow table currently stored by the first controller device.

In an aspect of the invention, there is a system comprising: a plurality of separate OpenFlow domains, each of the plurality of separate OpenFlow domains comprising: a plurality of endpoint devices; a controller device; and an edge device; where a plurality of endpoint devices from a first OpenFlow domain of the plurality of separate OpenFlow domains is accessible by a plurality of endpoint devices from a second OpenFlow domain of the plurality of separate OpenFlow domains via the plurality of controller devices and the plurality of edge devices. In a further aspect, the first controller of the first OpenFlow domain includes a CPU, a computer readable memory and a computer readable storage medium associated with a computing device; program instructions to receive a packet from an originating endpoint in the first OpenFlow domain destined for a destination endpoint in a second OpenFlow domain of the plurality of OpenFlow domains; program instructions to output a broadcast message identifying the destination endpoint to respective controller devices associated with the separate OpenFlow domains; program instructions to receive a response to the broadcast message from the destination endpoint via a controller device associated with the second OpenFlow domain; program instructions to update a local flow table identifying a flow for transmitting the packet to the destination endpoint based on information included in the response; and program instructions to transmit the packet towards the destination endpoint based on updating the local flow table, where the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
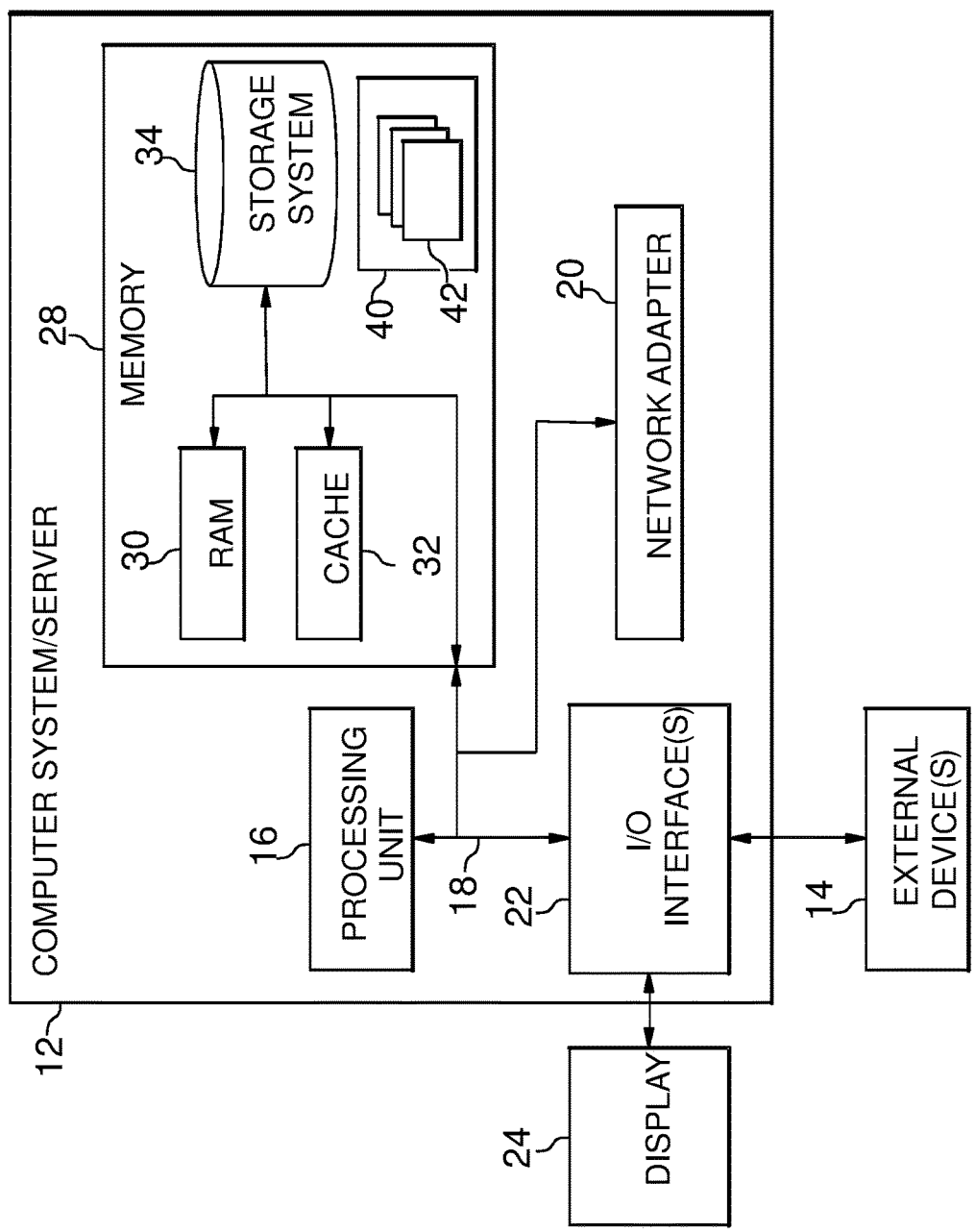
FIG. 1 depicts a cloud computing node according to an embodiment of the present invention.

The present invention generally relates to OpenFlow networks, and more particularly, to connecting endpoints between different OpenFlow domains. Aspects of the present invention provide a technique to permit different OpenFlow domains to interconnect and communicate with each other. The different OpenFlow domains may be in different geographic locations, or may even be in the same geographic location, but are separated for any number of reasons (e.g., to improve security, reduce network congestion associated with networks with a substantially large number of endpoints, etc.). Aspects of the present invention can extend the current OpenFlow protocol to provide a solution to interconnect multiple different OpenFlow domains. In embodiments, virtual private network (VPN) technologies may be utilized when interconnecting multiple different OpenFlow domains. Aspects of the present invention provide a technique to pass local network information from one OpenFlow controller to another over (e.g., in a secure manner via a VPN), thereby enabling the controllers from other OpenFlow domains to share the information about their domains so that one OpenFlow domain can interconnect with another OpenFlow domain.

In accordance with aspects of the present invention, a system of distributive OpenFlow controllers, each associated with respective OpenFlow domains, are connected via a VPN. Local information regarding local domain topology within each OpenFlow domain is shared between the OpenFlow controllers, and this information may be encrypted/decrypted during the sharing. For example, the information regarding local domain topology may identify the endpoints residing in each OpenFlow domain, as well as routing information for accessing the endpoints within each OpenFlow domain.

In embodiments, an edge device may be used for encryption and decryption functions. In accordance with aspects of the present invention information, information regarding local domain topology within each OpenFlow domain is shared proactively (e.g., on a schedule) so that the controllers across all of the OpenFlow domains store routing information used to access endpoints residing across all of the OpenFlow domains. In alternative embodiments, the information regarding local domain topology within each OpenFlow domain can be obtained on-demand (e.g., when an a data packet originates from one endpoint in one OpenFlow domain and is destined for another endpoint in another OpenFlow domain, and when the routing information to transmit the packet from the originating endpoint to the destination endpoint is currently unknown). Flows are installed in edge devices for each OpenFlow domain so that the edge devices of different OpenFlow domains can transmit packets to each other, and route the packets towards destination devices.

Aspects of the present invention provide a technical solution to the problem of interconnecting endpoints implemented in separate OpenFlow domains. For example, aspects of the present invention share flow information for endpoints implemented in separate OpenFlow domains, and synchronize flow tables generated by multiple different controller devices. Further, aspects of the present invention obtain flow information for a particular endpoint on demand by outputting broadcast messages to separate controllers instantiated in separate OpenFlow domains.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
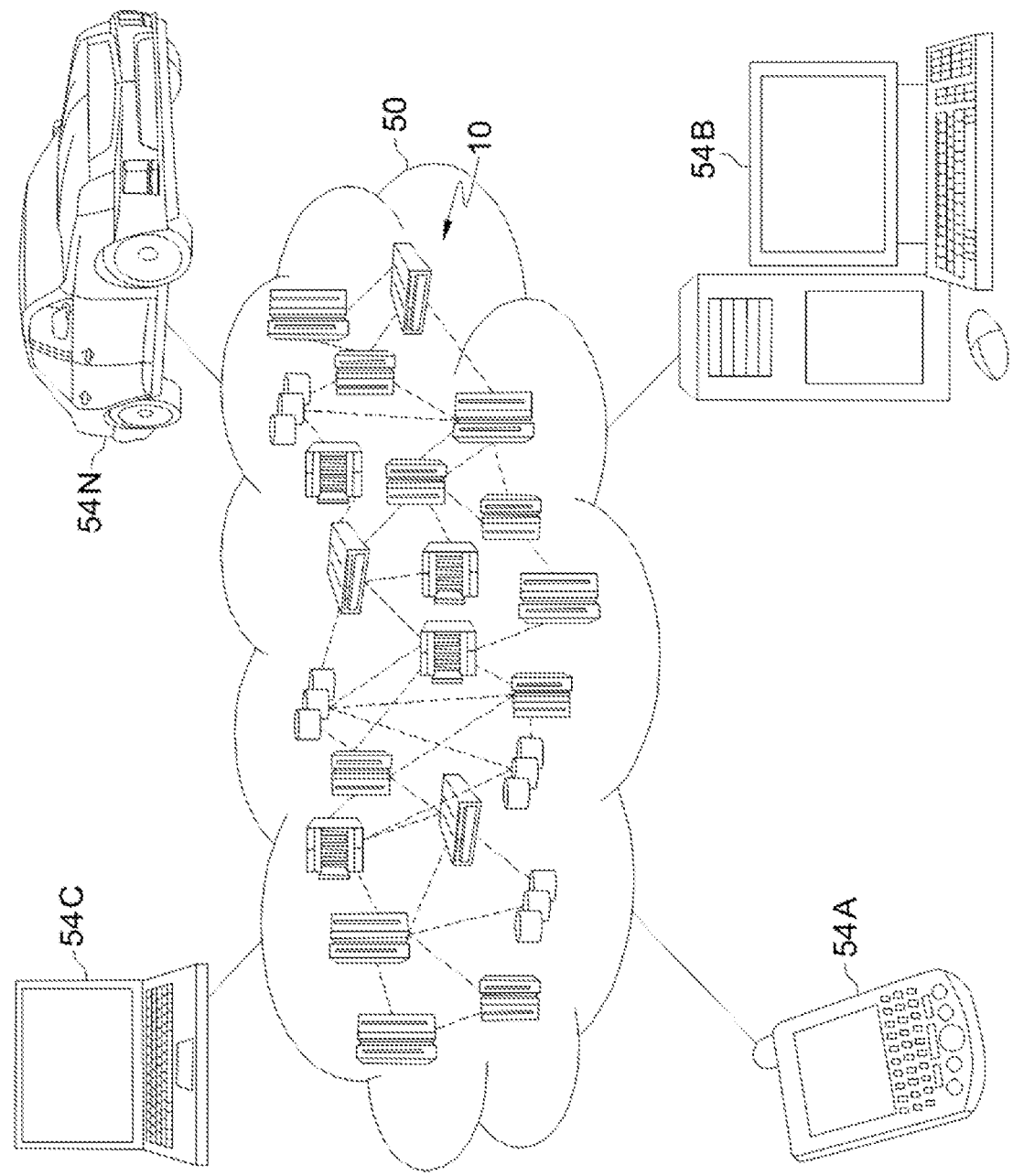
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
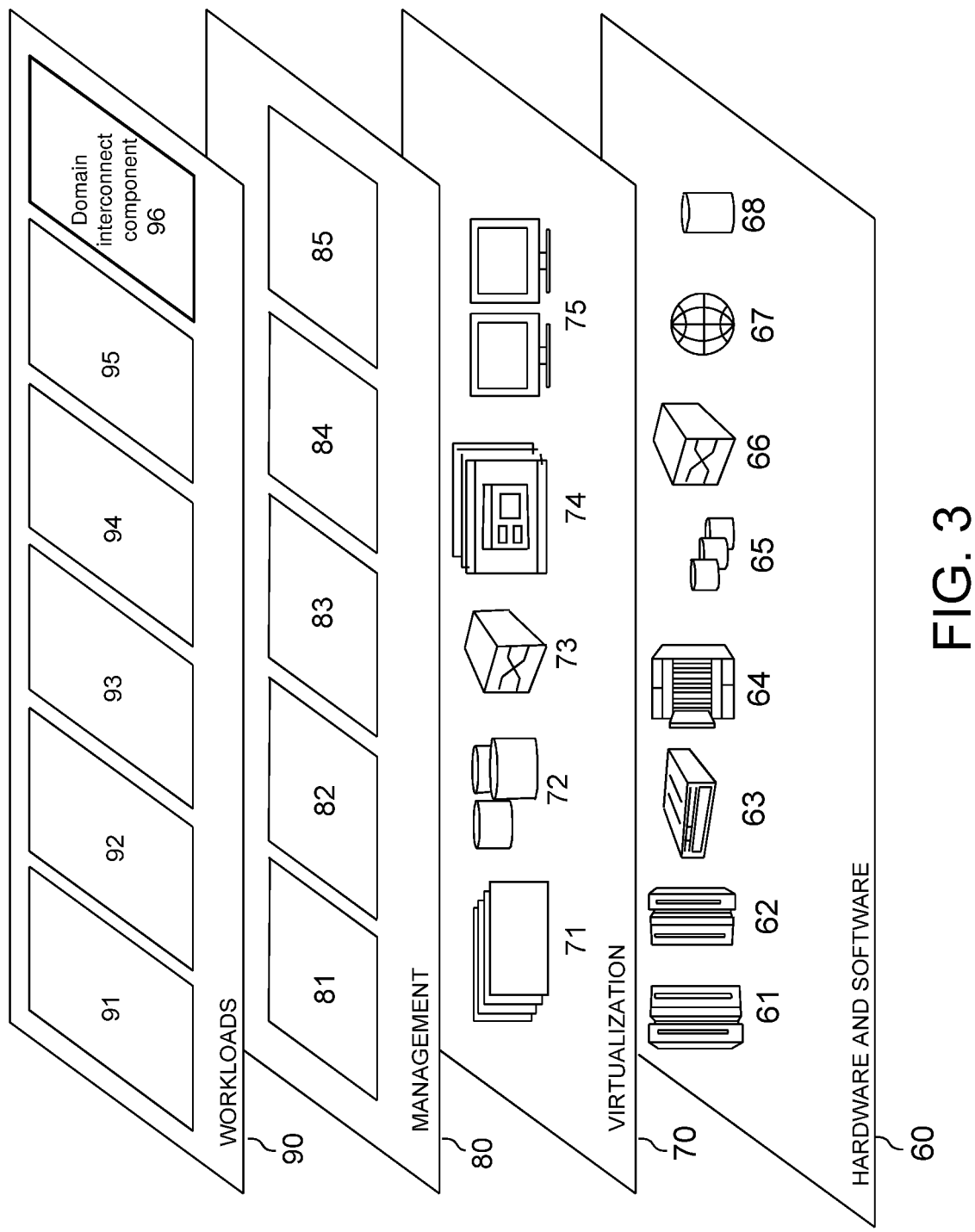
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and domain interconnect component 96.

Referring back to FIG. 1, the Program/utility 40 may include one or more program modules 42 that generally carry out the functions and/or methodologies of embodiments of the invention as described herein. Specifically, the program modules 42 may update and share routing information regarding endpoints and hosts OpenFlow domains (e.g., either proactively and/or on-demand). Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a domain interconnect component shown in FIG. 3.

Figure 4:
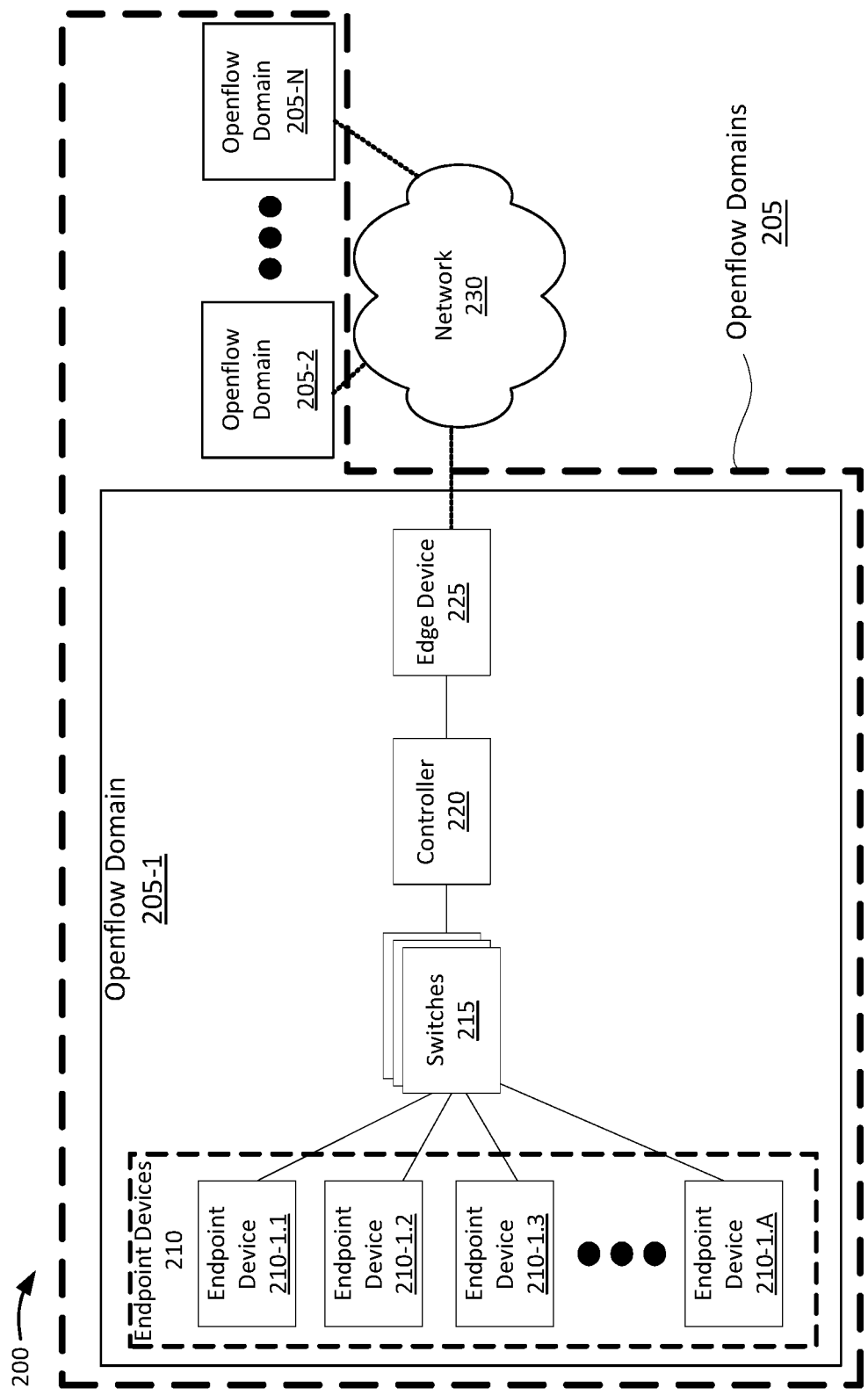
FIG. 4 shows an example environment in accordance with aspects of the present invention.

FIG. 4 shows an overview of an example environment in accordance with aspects of the present invention. As shown in FIG. 4, environment 200 may include OpenFlow domains 205 (e.g., OpenFlow domains 205-1, 205-2, . . . , 205-N (where N is greater than or equal to 1)) and a network 230. In embodiments, one or more components in environment 200 may correspond to one or more components in the cloud computing environment of FIG. 2.

In embodiments, one or more of OpenFlow domains 205 may include a software defined network (SDN) and/or other type of network. Each OpenFlow domain 205 may include endpoint devices 210, switches 215, a controller 220, and an edge device 225. In the example shown in FIG. 4, OpenFlow domain 205-1 may include endpoint devices 210-1.1 to 210-1.A (where A is greater than or equal to 1). The endpoints devices 210 may include a computing device, server device, mainframe, host, or the like. The endpoint devices 210 may implement any number or types of applications for various purposes. An endpoint device 210 may be an "originating" endpoint that transmits a packet towards a "destination" or "receiving" endpoint device 210 via Open-Flow domains 205. As described herein, aspects of the present invention permit an endpoint device 210 to communicate with an "external" endpoint device 210 (e.g., an endpoint device 210 in a different OpenFlow network 205).

The switches 215 may include network devices (e.g., hubs, routers, ports, or the like) that connect with the endpoint devices 210. A switch 215 may transmit packets from one endpoint device 210 to another endpoint device 210 connected to the same switch 215. If the switch 215 receives a packet for which it has no matching flow entries (e.g., if the packet is destined for an endpoint device 210 connected to a different switch 215), the switch 215 may output the packet to the controller 220.

The controller 220 may include a network device (e.g., an OpenFlow controller) that receives packets from the endpoint devices 210 (e.g., via the switches 215), and determines how to handle or route the packets to destination endpoint devices 210. The controller 220 for a particular OpenFlow domain 205 may store a local flow table identifying the culmination of flows between the endpoint devices 210 and the switches 215. For example, the controller 220 may build the local flow table by receiving information from each switch 215 for the endpoint devices 210 connected to each switch 215. The local flow table may identify the network topology and flow of the OpenFlow domain 205 associated with the controller 220. For example, the flow table may identify the switches 215 in the OpenFlow domain 205, which endpoint devices 210 are connected to particular switches 215, port numbers via which the endpoint devices 210 are connected to the switch 215, the media access control (MAC) addresses of each endpoint device 210, the prefix address of each endpoint device 210, the mask of each endpoint device 210, etc. As described herein, each controller 220 for each OpenFlow domain 205 may proactively share their local flow tables, and update the tables so that each controller 220 stores information needed to access endpoint devices 210 across multiple different OpenFlow domains 205. In embodiments, a controller 220 may obtain flow information for accessing an external endpoint device 210 "on-demand." For example, the controller 220 may output broadcast messages to identify the routing and flow information for a destination endpoint device 210. Further, each controller 220 may install flows in their respective edge devices 225 (e.g., so that the edge devices 225 can transmit packets to devices outside of their respective OpenFlow domains 205).

The controller 220 may use the local flow table to identify how to handle or route a packet received from an originating endpoint device 210 destined for a destination endpoint device 210. For example, the controller 220 may route the packet to a local switch 215 within the same OpenFlow domain 205 as the controller 220 (e.g., when the destination endpoint device 210 is in the same OpenFlow domain 205 as the originating endpoint device 210). In embodiments (e.g., when the destination endpoint device 210 is in a different OpenFlow domain 205 as the originating endpoint device 210), the controller 220 may route the packet to the edge device 225, and the edge device 225 may then transmit the packet towards the destination endpoint device 210.

The edge device 225 may include one or more computing devices and/or network devices, such as an OpenFlow switch. In embodiments, the edge device 225 may be a hybrid computing/network device. In embodiments, the edge device 225 may transmit a packet to an external edge device 225 (e.g., an edge device 225 residing in a different OpenFlow domain 205) for transmission to an external endpoint device 210. In embodiments, the edge device 225 may perform encryption and decryption functions on behalf of the controller 220. In embodiments, the edge device 225 may function differently at various times. For example, the edge device 225 may function as a secure encryption/decryption device with VPN capabilities to communicate with external edge devices 225. Additionally, or alternatively, the edge device 225 may function as a standard OpenFlow switch. The edge device 225 may output capability flags indicating its mode of operation. When the edge device 225 is functioning as an edge device, the controller 220 may discover the edge device 225 based on the capability flag indicating the mode of operation for the edge device 225.

In embodiments, the domain interconnect component 96 shown in FIG. 3 may include the controller 220 and/or the edge device 225. More specifically, the functions described as being performed by the controller 220 may be performed by the edge device 225, and vice versa. Also, in embodiments, controller 220 and edge device 225 may be implemented as single component.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 4. In practice, the environment 200 may include additional devices and/or networks; fewer devices and/or networks; different devices and/or networks; or differently arranged devices and/or networks than illustrated in FIG. 4. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 5:
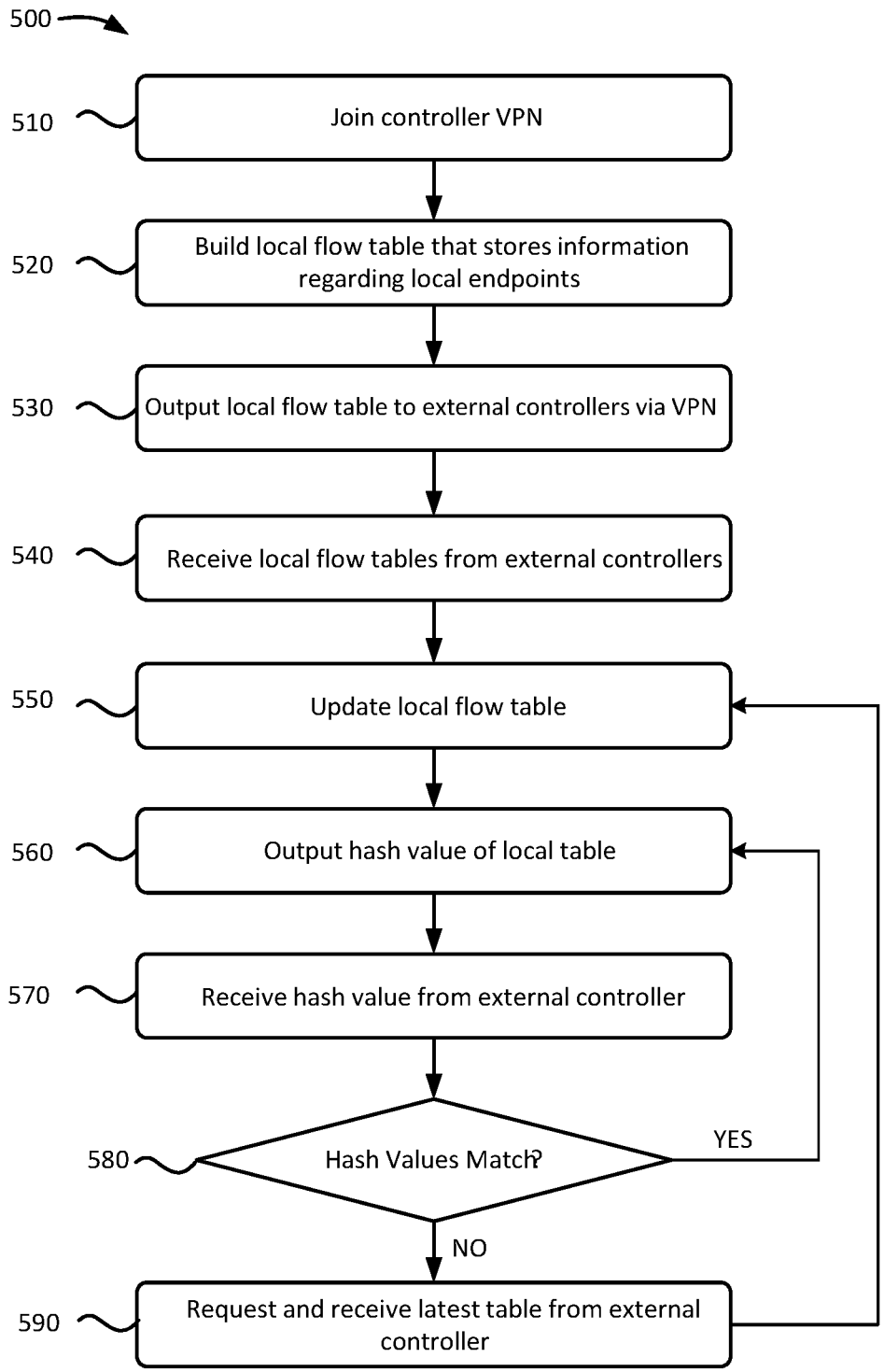
FIG. 5 shows an example flowchart for proactively sharing routing information between controllers in different OpenFlow domains in accordance with aspects of the present invention.

FIG. 5 shows an example flowchart for proactively sharing routing information between controllers in different OpenFlow domains. The steps of FIG. 5 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention. The steps of FIG. 5 may be performed by a particular controller 220 in a particular OpenFlow domain 205.

As shown in FIG. 5, process 500 may include joining a controller VPN (step 510). For example, a controller (e.g., controller 220 of FIG. 4) may join a VPN established for controllers 220 associated with a trusted group of OpenFlow domains (e.g., OpenFlow domains 205 of FIG. 4) with which local flow tables are shared.

Process 500 may also include building a local flow table that stores information regarding local endpoints (step 520). For example, the controller may communicate with the switches (e.g., switches 215) within the same OpenFlow domain as the controller to obtain information regarding the endpoint devices (e.g., endpoint devices 210) connected to each of the switches. In embodiments, the 220 may build the local flow table by storing information such as the MAC addresses, the prefix addresses, and the masks of the endpoint devices connected to the switches 215 within the same OpenFlow domain as the controller. The local flow table may also include an ID of the controller 220. An example flow table is shown in Table 1:

TABLE 1

Example of Local Flow Table

| MAC | Prefix | Mask | Source Controller ID |
| --- | --- | --- | --- |
| 00:00:00:00:22:01 | 40.1.1.1 | 32 | OF-CTRL-A |
| 00:00:00:00:22:1B | 50.1.1.10 | 32 | OF-CTRL-A |
| 00:00:00:00:44:1B | 60.1.1.50 | 32 | OF-CTRL-A |

Process 500 may further include outputting the local flow table to external controllers via the VPN (step 530). For example, the controller may output its local flow table to the external controllers (e.g., controllers in a different OpenFlow domain) via the established controller VPN as described in step 510. At this stage, the external controllers may also provide their respective local flow tables.

Process 500 may further include receiving local flow tables from the external controllers (step 540). For example, the controller may receive local flow tables from external controllers.

Process 500 may also include updating the local flow table (step 550). For example, the controller may update its own local flow table based on the local flow tables received from the external controllers. Table 2 shows an example of the updated local flow table after updating. Updated entries are shown with asterisks (*).

TABLE 2

Example of Local Flow Table After Update

| MAC | Prefix | Mask | Source Controller ID |
| --- | --- | --- | --- |
| 00:00:00:00:22:01 | 40.1.1.1 | 32 | OF-CTRL-A |
| 00:00:00:00:22:1B | 50.1.1.10 | 32 | OF-CTRL-A |
| 00:00:00:00:44:1B | 60.1.1.50 | 32 | OF-CTRL-A |
| 00:00:00:00:11:22* | 50.1.1.25* | 32* | OF-CTRL-B* |

Process 500 may further include outputting a hash value of the local table (step 560). For example, the controller may output a hash value of its local table to external controllers. In embodiments, the controller may output the hash value at periodic maintenance intervals. As described below, the hash value is used to determine whether the local flow table is up to date with respect to the local flow tables stored by the external controllers.

Process 500 may also include receiving a hash value from an external controller (step 570). For example, the controller may receive a hash value from an external controller (e.g., at periodic maintenance intervals).

Process 500 may further include determining whether the hash values match (step 580). For example, the controller may determine whether the hash value of its local table matches the hash value received from the external controller. If, for example, the hash value matches (step 580—YES), process 500 may return to step 560 by outputting a hash value of the local table at the next maintenance interval.

If, for example, the hash values do not match (step 580—NO), process 500 may further include requesting and receiving the latest flow table from the external controller (step 590). For example, the controller may request and receive the latest flow table from the external controller from which a non-matching hash value was received. Process 500 may then return to step 550 where the local flow table is updated based on the received latest flow table from the external controller, followed by outputting a hash value of the local table of the controller (e.g., at the next maintenance interval). Advantageously, all of the controllers in a group of trusted OpenFlow domains have synchronous and up-to-date local tables that identify flow information for the endpoints devices in each OpenFlow domain.

In alternative embodiments, some of the steps in process 500 may be omitted or modified. For example, step 510 may be modified to join a non-VPN network if the use of a VPN is not desired.

Figure 6:
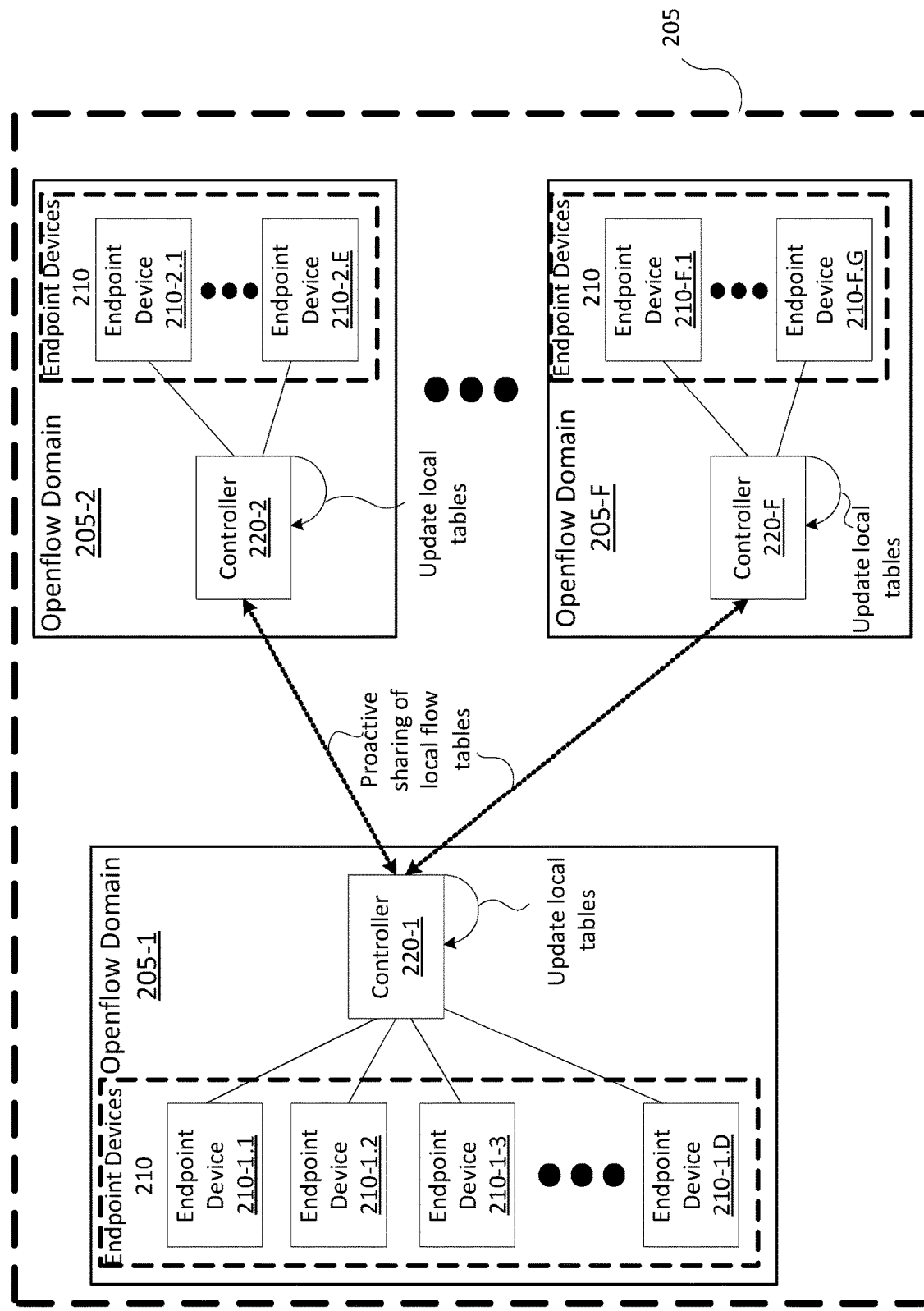
FIG. 6 shows an example implementation for proactively sharing routing information between controllers in different OpenFlow domains in accordance with aspects of the present invention.

FIG. 6 shows an example implementation for proactively sharing routing information between controllers in different OpenFlow domains. As shown in FIG. 6, controller 220-1 (e.g., the controller associated with OpenFlow domain 205-1) communicates with the controllers 220-2 through 220-F of OpenFlow domains 205-2 through 205-F (where F is a number greater than or equal to 2). As part of the communication, the controllers 220-2 through 220-F proactively share their respective local flow tables at an initial set-up and at periodic maintenance intervals (e.g., in accordance with process 500 as described above). Advantageously, all of the controllers 220-2 through 220-F in a group of trusted OpenFlow domains 205 have synchronous and up-to-date local tables that identify flow information for the endpoints 210 in each OpenFlow domain 205. In embodiments, the controllers 220 may communicate directly with each other via a controller channel, or via respective edge devices 225 (e.g., the edge devices 225 of FIG. 4).

Figure 7:
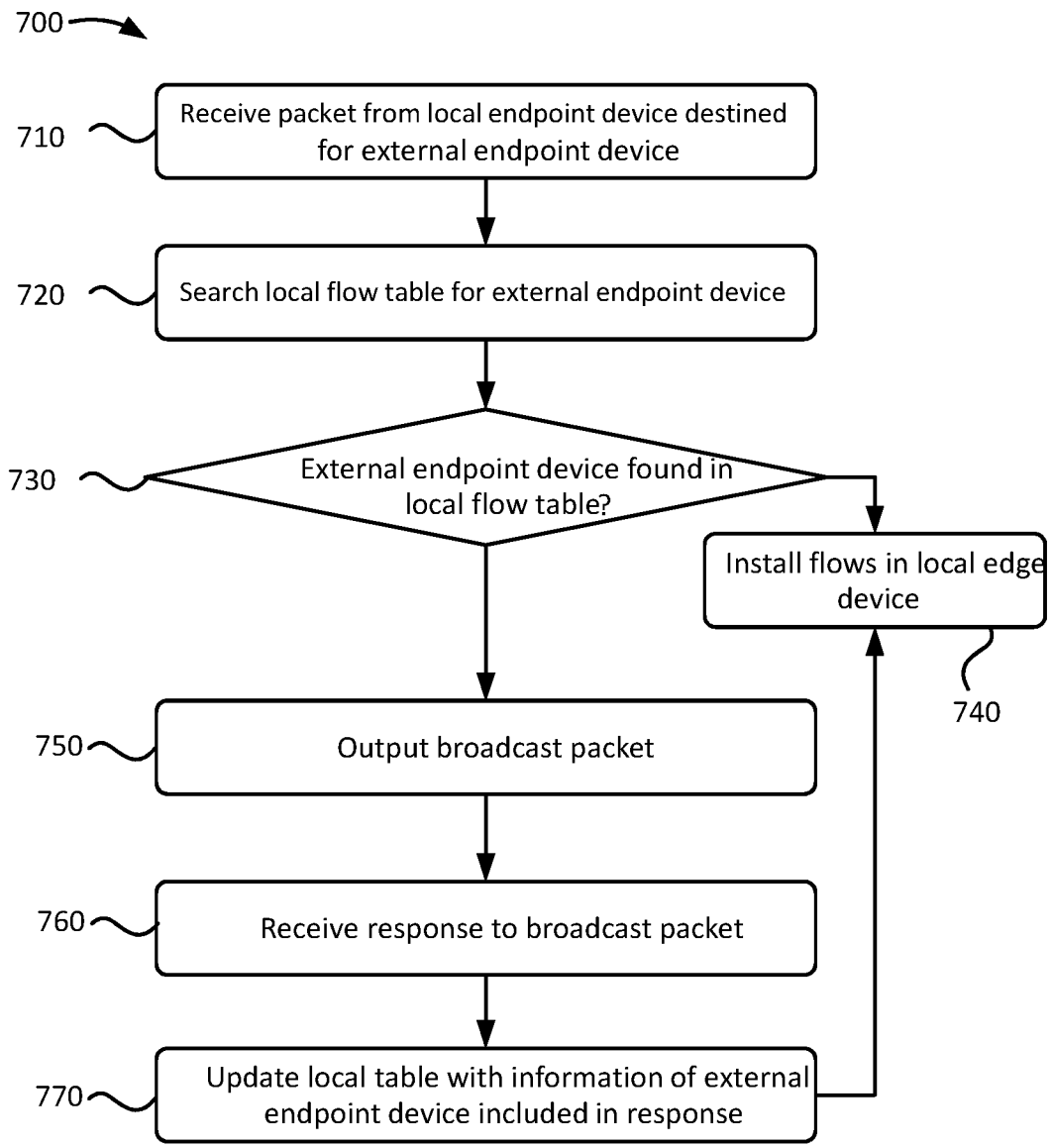
FIG. 7 shows an example flowchart for obtaining flow information for a particular external endpoint on-demand in accordance with aspects of the present invention.

FIG. 7 shows an example flowchart for obtaining flow information for a particular external endpoint on-demand.

The steps of FIG. 7 may be implemented in the environments of FIG. 4 or 6, for example, and are described using reference numbers of elements depicted in FIG. 4 or 6. As noted above, the flowchart illustrates the architecture, functionality, and operation of possible implementations of systems, methods, and computer program products according to various embodiments of the present invention. The steps of FIG. 7 may be performed by a particular controller in a particular OpenFlow domain.

As shown in FIG. 7, process 700 may include receiving a packet from a local endpoint device (e.g., endpoint device 210-1.1) destined for an external endpoint device 210 (e.g., endpoint device 210-2.1) (step 710). For example, a "local" controller (e.g., controller 220) may receive a packet from the local endpoint device that is destined for the external endpoint device. The local controller may receive the packet via a switch (e.g., switch 215) connected to the local endpoint device. In embodiments, the packet may be a "ping" packet that is designed to "ping" the external endpoint device. Alternatively, the packet may include payload data that should be received by the external endpoint device. In embodiments, the local controller 220 may temporarily store the packet if the packet is marked as having payload data (e.g., based on information stored in a header of the packet).

Process 700 may further include searching the local flow table for the external endpoint device (step 720). For example, the local controller may search its local flow table for the external endpoint device (e.g., based on a MAC address, IP address, and/or other identifier).

Process 700 may also include determining whether the external endpoint device is found in the local flow table (step 730). For example, the local controller may determine whether the external endpoint device is found based on searching the local flow table. If, for example, the external endpoint device is found (step 730—YES), process 700 may include installing flows in the local edge device (step 740). For example, the local controller 220 may install flows in a local edge device (e.g., an edge device 225 of the same OpenFlow domain 205 as the local controller) such that the local edge device may route packets to the external endpoint device 210 based on the flow information in the local flow table for the external endpoint device 210. In embodiments, the local controller may install detailed flow definitions and/or detailed flow actions in the local edge device in order for the local edge device to properly route packets to the external endpoint device. In embodiments, if the packet received at step 710 included payload data, the local controller may output the packet to the local edge device after installing the flows so that the local edge device may transmit the packet towards the external endpoint device.

If, on the other hand, the external endpoint device is not found in the local flow table (step 730—NO), process 700 may further include outputting a broadcast packet (step 750). For example, the local controller may output a broadcast packet towards external controllers associated with external OpenFlow domains. In embodiments, the broadcast packet may include an identifier of the external endpoint device for which the packet is destined. In embodiments, the local controller may output the broadcast packet directly to the external controllers via a control channel. In alternative embodiments, the local controller 220 may output the broadcast packet, and the local edge device may encrypt the broadcast packet on behalf of the local controller. The local edge device may output the encrypted broadcast packet to external edge devices associated with respective OpenFlow domains 205. The external edge devices may each decrypt the broadcast packet, and provide the decrypted broadcast packet to their respective controllers. Each external controller 220 may receive the decrypted broadcast packet, and output the broadcast packet to their respective endpoint devices 210. The external endpoint device identified in the broadcast packet may then output a response to its controller (e.g., the controller in the same OpenFlow domain as the external endpoint device). This external controller may then output response to the broadcast packet towards the originating (i.e., local) controller. The response indicates the address and/or flow information for the external endpoint device identified in the broadcast packet.

In embodiments, the external controller may output the response to the broadcast packet directly to the local controller, or via the edge devices associated with the OpenFlow domains of the local controller and the external controller. For example, the external edge device may receive the response, encrypt the response, and output the encrypted response to the local edge device. The local edge device may decrypt the response, and provide the decrypted response to the local controller.

Process 700 may further include receiving a response to the broadcast packet (step 760). For example, the local controller may receive the response to the broadcast packet (e.g., directly from the external controller or from the local edge device after the local edge device receives the encrypted response from the external edge device).

Process 700 may also include updating the local flow table with information of external endpoint included in the response (step 770). For example, the local controller may update its local flow table with the information of the external endpoint device included in the response. Process 700 may then return to step 740 in which the flows are installed in the local edge device. Advantageously, packets are then able to be transmitted between local and external endpoint devices associated with different OpenFlow domains.

Figure 8:
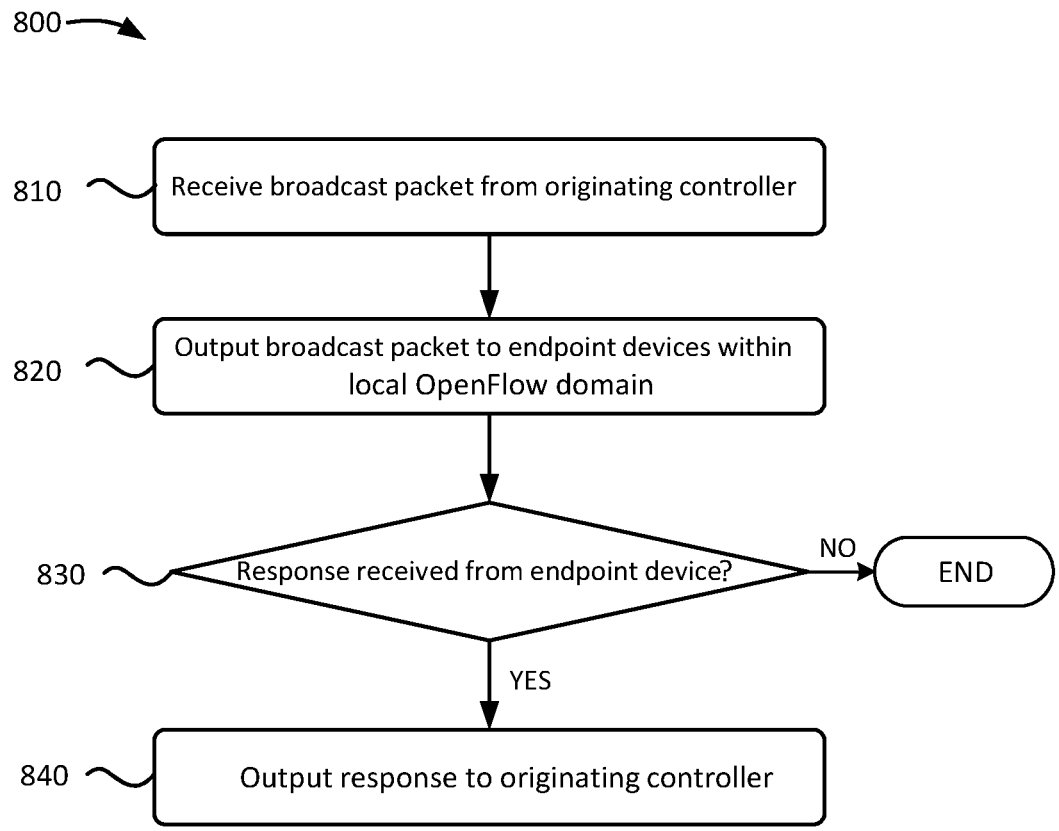
FIG. 8 shows an example flowchart for responding to a response packet received from an originating controller in accordance with aspects of the present invention.

FIG. 8 shows an example flowchart for responding to a response packet received from an originating controller. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention. The steps of FIG. 8 may be performed by a particular controller 220 in a particular OpenFlow domain 205.

As shown in FIG. 8, process 800 may include receiving a broadcast packet from an originating controller. In FIG. 8, the "originating" controller (e.g., controller 220) is considered an "external" controller. In embodiments, a local controller (e.g., another controller 220) may receive a broadcast packet from the originating controller. In embodiments, the local controller may receive the broadcast packet directly from the originating controller via a control channel. In alternative embodiments, the local controller may receive the broadcast packet after the broadcast packet has been encrypted by the originating edge device (e.g., the edge device 225 in the same OpenFlow domain 205 as the originating controller), and decrypted by the local edge device.

Process 800 may include outputting a broadcast packet to endpoint devices within the local OpenFlow domain (step 820). For example, the local controller may output the broadcast packet to its local endpoint device. As described above, the broadcast packet may include information for a particular endpoint device for which a packet is destined. The endpoint devices may receive the broadcast packet. One of the endpoint device (or its connecting switch) may respond if the broadcast packet includes an identifier for the endpoint device 210.

Process 800 may further include determining whether a response is received from an endpoint device (step 830). For example, the local controller may await a response from an endpoint device (or its connecting switch) if any of the endpoint devices in the OpenFlow domain of the controller matches the identifier in the broadcast packet. If, for example, a response is not received from an endpoint device (e.g., after a pre-determined "time-out" period), a determination is made that the endpoint device in the broadcast packet is not in the OpenFlow domain of the local controller (step 830—NO) and process 800 ends.

If, on the other hand, a response is received from an endpoint device, process 800 may include outputting the response to the originating controller. For example, the local controller may output the response to the originating controller. In embodiments, the response may include flow information for accessing the endpoint device. In embodiments, the response may be directly outputted to the originating controller. In alternative embodiments, the response may be encrypted by the local edge device, decrypted by the originating edge device, and then sent to the originating controller.

Process 800 may be performed for each controller in a group of OpenFlow domains that receive a broadcast message. Advantageously, the flow information for a particular endpoint device is received by an originating controller. The flow information is then installed in the originating edge device so that the originating edge device may transmit packets to the particular endpoint device outside of the OpenFlow domain of the originating edge device.

Figure 9:
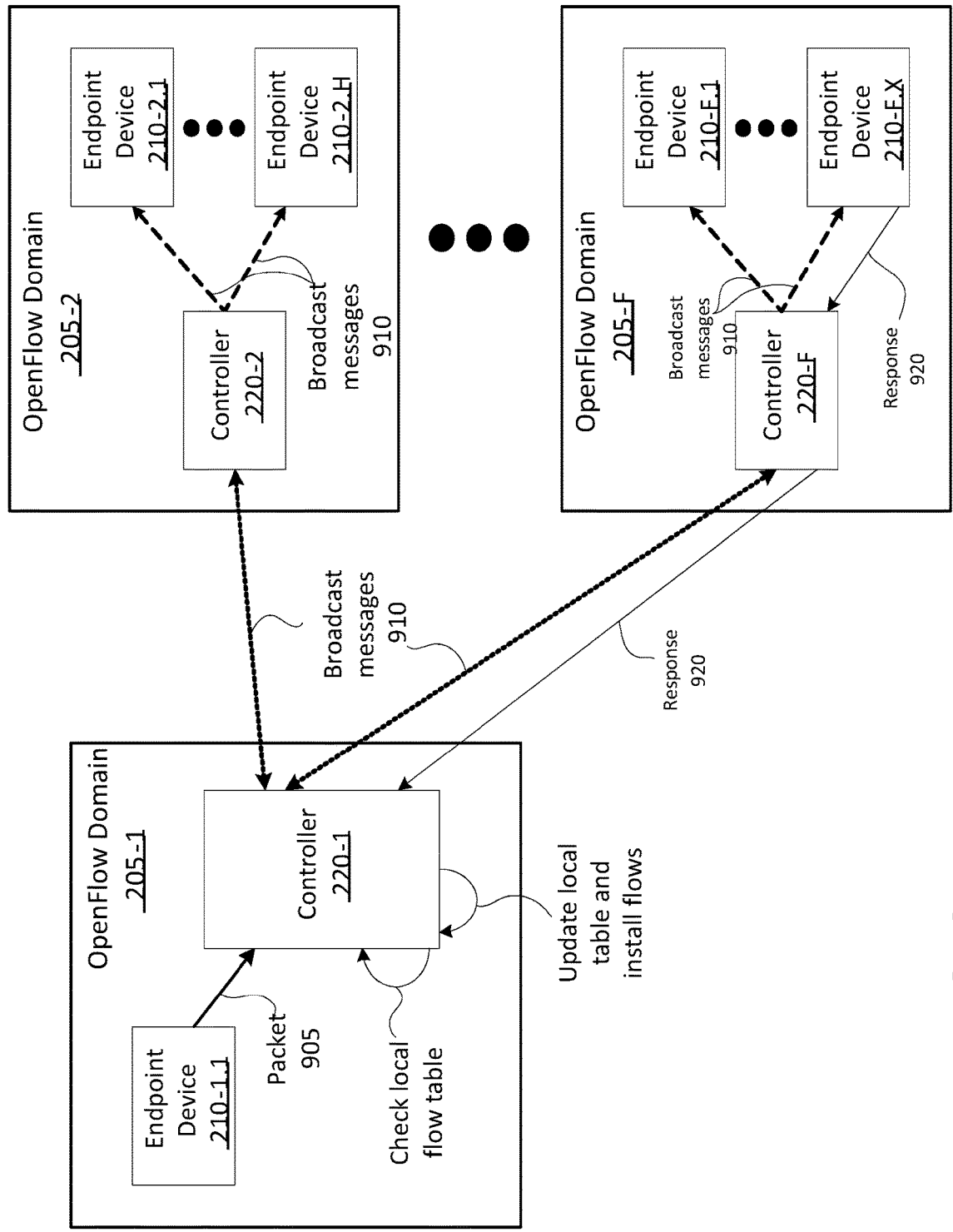
FIG. 9 shows an example for obtaining flow information for a particular external endpoint on-demand in accordance with aspects of the present invention.

FIG. 9 shows an example for obtaining flow information for a particular external endpoint on-demand. As shown in FIG. 9, an endpoint device 210-1.1 associated with the OpenFlow domain 205-1 transmits a packet 905 destined for an endpoint device in another OpenFlow domain. The controller 220-1 receives the packet, and checks whether the local flow table stores flow information for the destination endpoint device. Assuming that the local flow table does not store the flow information for the destination endpoint device, the controller 220-1 may output broadcast messages 910 to the controllers of the OpenFlow domains 205-2 through 205-F (where F is greater than or equal to 2). Each of the controllers 220-2 through controller 220-F may then output broadcast messages 910 to their respective endpoint devices 210. For example, the controller 220-2 may output the broadcast messages 910 to endpoint devices 210-2.1 to 210-2.H (where H is greater than or equal to 1). Similarly, the controller 220-F may output the broadcast messages 910 to endpoint device 210-F.1 to 210-F.X (where X is greater than or equal to 1).

The endpoint device within the OpenFlow domains 205-2 to 205-F that matches the ID in the broadcast messages 910 may then output a response. For example, assuming that the endpoint device 210-F.X matches the ID in the broadcast message, the endpoint device 210-F.X may output a response 920 to its controller (i.e., controller 220-F). Controller 220-F may then output the response 920 to the originating controller (i.e., controller 220-1), and controller 220-1 may update its local flow table and install the necessary flows (e.g., in an edge device in the OpenFlow Domain 205-1). As described above, the broadcast messages 910 and the response 920 may be encrypted, decrypted, and transmitted via edge devices.

Figure 10:
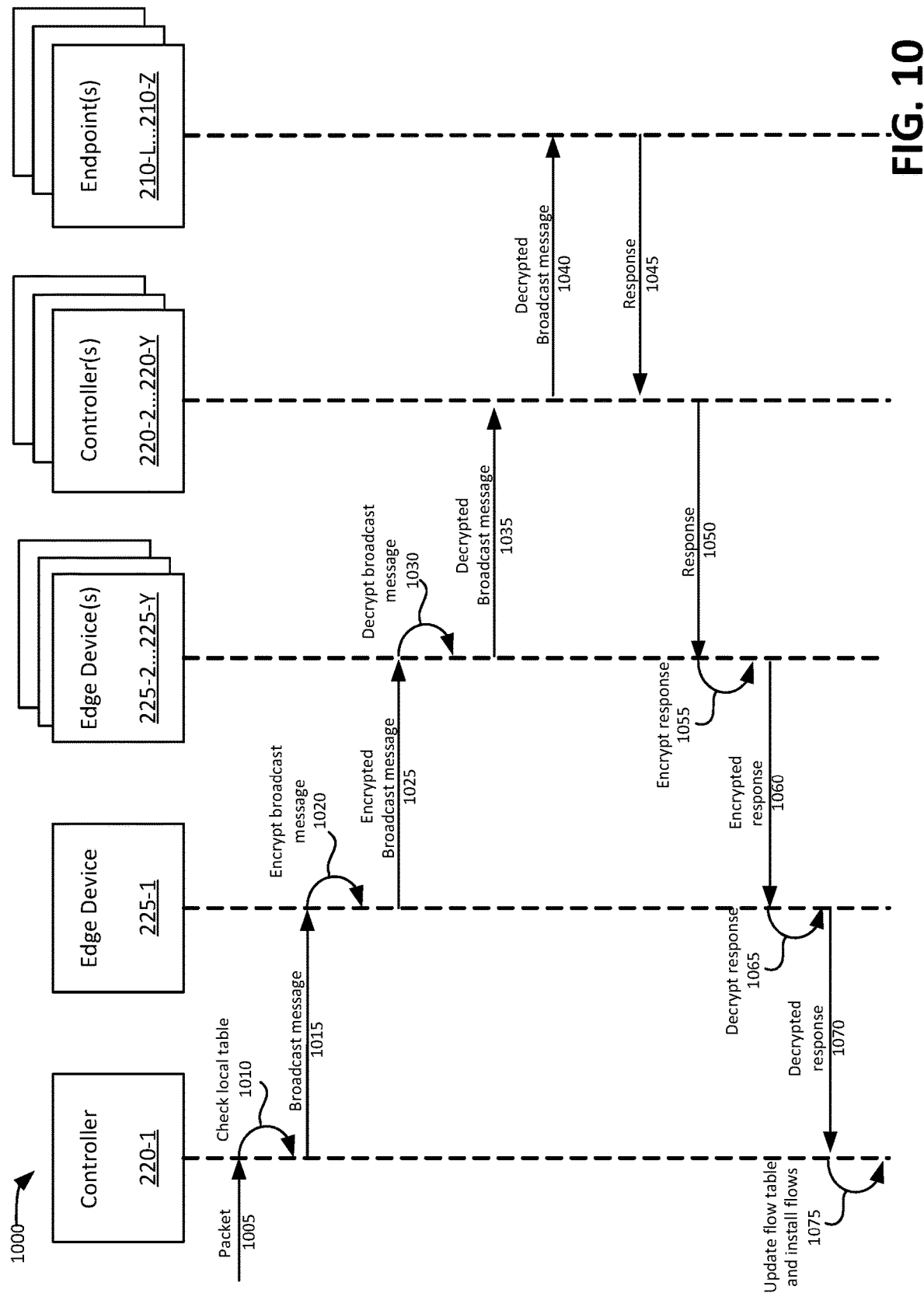
FIG. 10 shows a call flow diagram for obtaining flow information for a particular external endpoint on-demand in accordance with aspects of the present invention.

FIG. 10 shows a call flow diagram for obtaining flow information for a particular external endpoint on-demand. As shown in FIG. 10, the controller 220-1 may receive a packet (step 1005) from an originating endpoint device 210. Based on receiving the packet, the controller 220-1 may check its local flow table (step 1010). Assuming that a destination endpoint device 210 identified in the packet is not in the local flow table, the controller 220-1 may output broadcast message (step 1015) to its edge device 225-1. The edge device 225-1 may encrypt the broadcast message (step 1020), and may output the encrypted broadcast messages to external edge devices 225-2 to 225-Y (step 1025). In embodiments, the edge device 225-1 may transmit the encrypted broadcast message via a VPN. The edge devices 225-2 to 225-Y may each decrypt the broadcast message (step 1030), and output the decrypted broadcast message to their respective controllers 220-2 to 220-Y (step 1035). The controllers 220-2 to 220-Y may each output the decrypted broadcast messages to their respective endpoint devices 210 (e.g., endpoint devices 210-L to 210-Z). A particular one of the endpoints 210-L to 210-Z that has the ID in the broadcast message may respond (step 1045). The corresponding controller 220 may then output the response to its edge device 225 (step 1050). The edge device 225 may encrypt the response (step 1055), and output the encrypted response (at step 1060) to the originating edge device 225 (e.g., edge device 225-1). The edge device 225-1 may decrypt the response (at step 1065), and output the encrypted response to the controller 220-1 (at step 1070). The controller 220-1 may then update its flow table and install the flows (at step 1075).

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having program instructions embodied therewith, the program instructions executable by a first controller device to cause the first controller device to:
   build a first local flow table that stores flow information regarding endpoint devices in a same OpenFlow domain as the first controller device, wherein the flow information stored within first local flow table includes a mask of each of the endpoint devices connected to switches of the endpoint devices in the same OpenFlow domain as the first controller device;
   use the first local flow table to identify how to handle a packet received from an originating endpoint device of the endpoint devices in the same OpenFlow domain as the first controller device;
   route the packet to an edge device within the same OpenFlow domain as the first controller device, wherein the edge device outputs capability flags indicating its mode of operation;
   output the first local flow table to a second controller device residing in a different OpenFlow domain than the first controller device;
   receive a second local flow table from the second controller device, wherein the second local flow table stores flow information regarding endpoint devices in a same OpenFlow domain as the second controller device; and
   update the first local flow table based on receiving the second local flow table.

2. The computer program product of claim 1, wherein the program instructions further cause the first controller device to periodically communicate with the second controller device to synchronize the first local flow table of the first controller device with the second local flow table of the second controller device.

3. The computer program product of claim 2, wherein periodically communicating with the second controller device comprises:
   receiving a hash value of the second local flow table from the second controller device; and
   requesting an updated second local flow table from the second controller device when the hash value does not match a hash value of the first local flow table currently stored by the first controller device.

4. The computer program product of claim 3, wherein the program instructions further cause the first controller device to:
   update the first local flow table based on receiving an updated second local flow table; and
   output a hash value of the updated first local flow table to the second controller device.

5. The computer program product of claim 2, wherein the periodically communicating with the second controller device comprises periodically outputting a hash value of the local flow table currently stored by the first controller device to the second controller device.

6. The computer program product of claim 1, wherein the first local flow table is output and the second local flow table is received via a virtual private network (VPN).

7. The computer program product of claim 1, wherein the building the first local flow table comprises receiving information from the switches of the endpoint devices in the same OpenFlow domain as the first controller device.

8. The computer program product of claim 7, wherein the flow information stored within first local flow table comprises one or more of the group consisting of: information identifying the switches in the OpenFlow domain of the first controller device; information regarding which of the endpoint devices are connected to which of the switches; port numbers via which the endpoint devices are connected to the switches; a media access control address of each of the endpoint devices; and a prefix address of each of the endpoint devices.

9. The computer program product of claim 2, wherein the communication between the first controller device and the second controller device is performed directly via a controller channel.

10. The computer program product of claim 2, wherein the communication between the first controller device and the second controller device is performed indirectly via respective edge devices of the OpenFlow domain of the first controller device and the OpenFlow domain of the second controller device.

11. The computer program product of claim 10, wherein the packet is destined for a destination endpoint device in the same OpenFlow domain as the originating endpoint device.

12. The computer program product of claim 11, wherein the edge device in an OpenFlow switch within the same OpenFlow domain as the first controller device.

13. The computer program product of claim 12, wherein:
   the originating endpoint device and the destination endpoint device are connected to the switch, and
   the switch transmits the packet from the originating endpoint device to the destination endpoint device.

14. The computer program product of claim 10, wherein the packet is destined for a destination endpoint device in the different OpenFlow domain.

15. The computer program product of claim 14, wherein the edge device transmits the packet towards the destination endpoint device.

16. The computer program product of claim 15, wherein the edge device performs encryption and decryption functions on behalf of the first controller.

17. The computer program product of claim 16, wherein the program instructions further cause the first controller device to join a virtual private network (VPN) established for controllers associated with a trusted group of OpenFlow domains.

18. A computer program product comprising a non-transitory computer readable storage medium having program instructions embodied therewith, the program instructions executable by a first controller device to cause the first controller device to:
   build a first local flow table that stores flow information regarding endpoint devices in a same OpenFlow domain as the first controller device;
   use the first local flow table to identify how to handle a packet received from an originating endpoint device of the endpoint devices in the same OpenFlow domain as the first controller device, wherein the packet is destined for a destination endpoint device in a different OpenFlow domain;
   output the first local flow table to a second controller device residing in a different OpenFlow domain than the first controller device;

receive a second local flow table from the second controller device, wherein the second local flow table stores flow information regarding endpoint devices in a same OpenFlow domain as the second controller device;

update the first local flow table based on receiving the second local flow table;

periodically communicate with the second controller device to synchronize the first local flow table of the first controller device with the second local flow table of the second controller device, wherein the periodic communication between the first controller device and the second controller device is performed indirectly via respective edge devices of the OpenFlow domain of the first controller device and the OpenFlow domain of the second controller device; and route the packet to an edge device of the edge devices of the OpenFlow domain of the first controller device, wherein:

the edge device transmits the packet towards the destination endpoint device, the edge device performs encryption and decryption functions on behalf of the first controller, and the edge device outputs capability flags indicating its mode of operation.

19. The computer program product of claim 18, wherein the program instructions further cause the first controller device to discover the edge device based on a capability flag indicating the mode of operation for the edge device.

20. The computer program product of claim 19, wherein:

the first local flow table identifies switches in the same OpenFlow domain as the first controller device, and the first local flow table identifies a culmination of flows between the endpoint devices and the switches in the same OpenFlow domain as the first controller device.

* * * * *